United States Patent Office 2,851,845
Patented Sept. 16, 1958

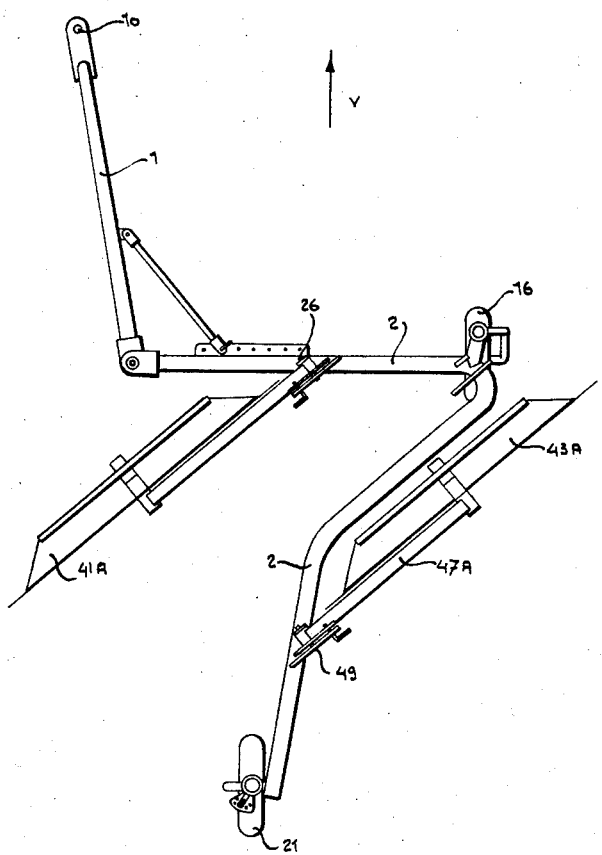

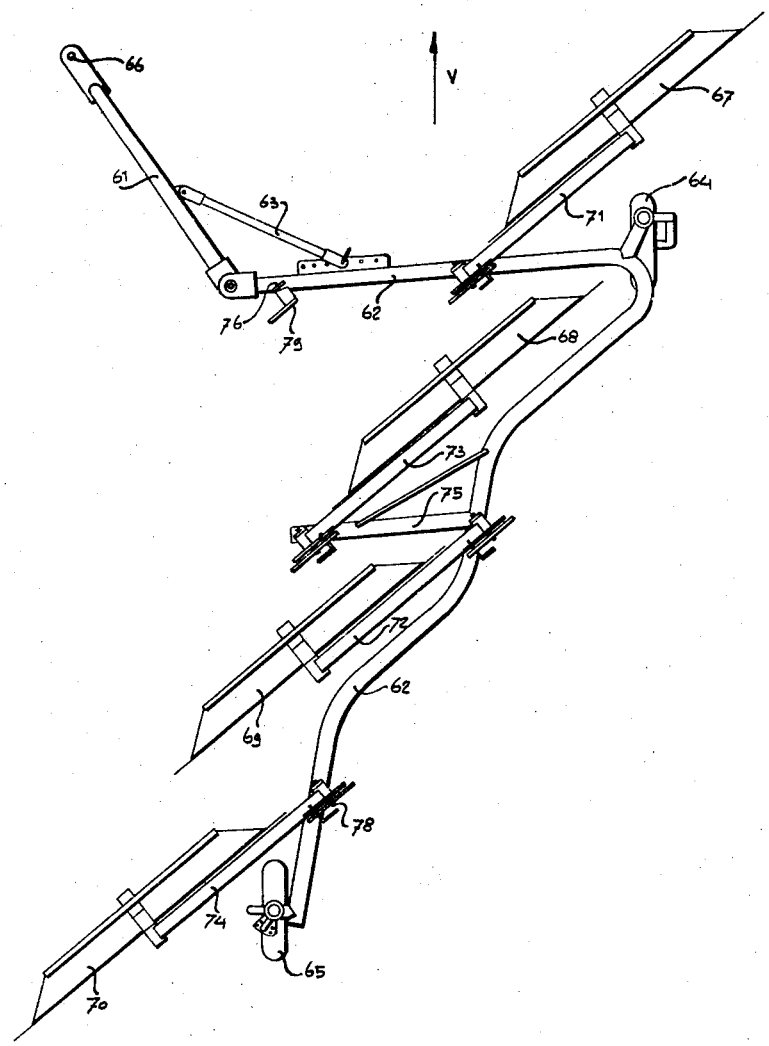

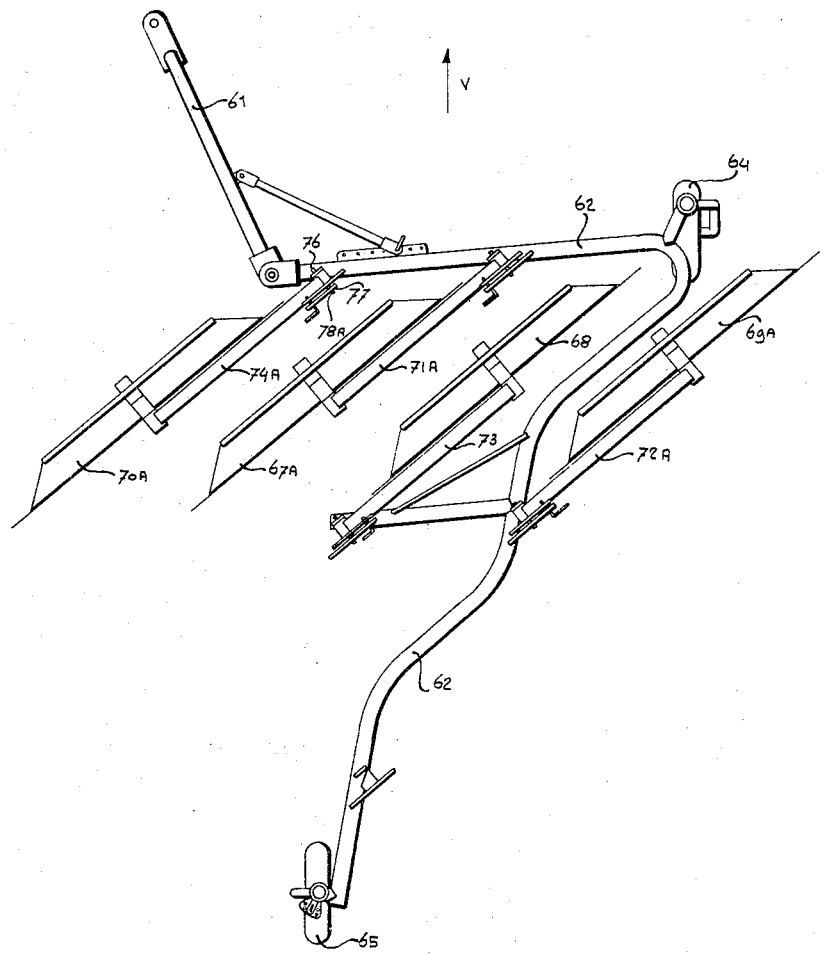

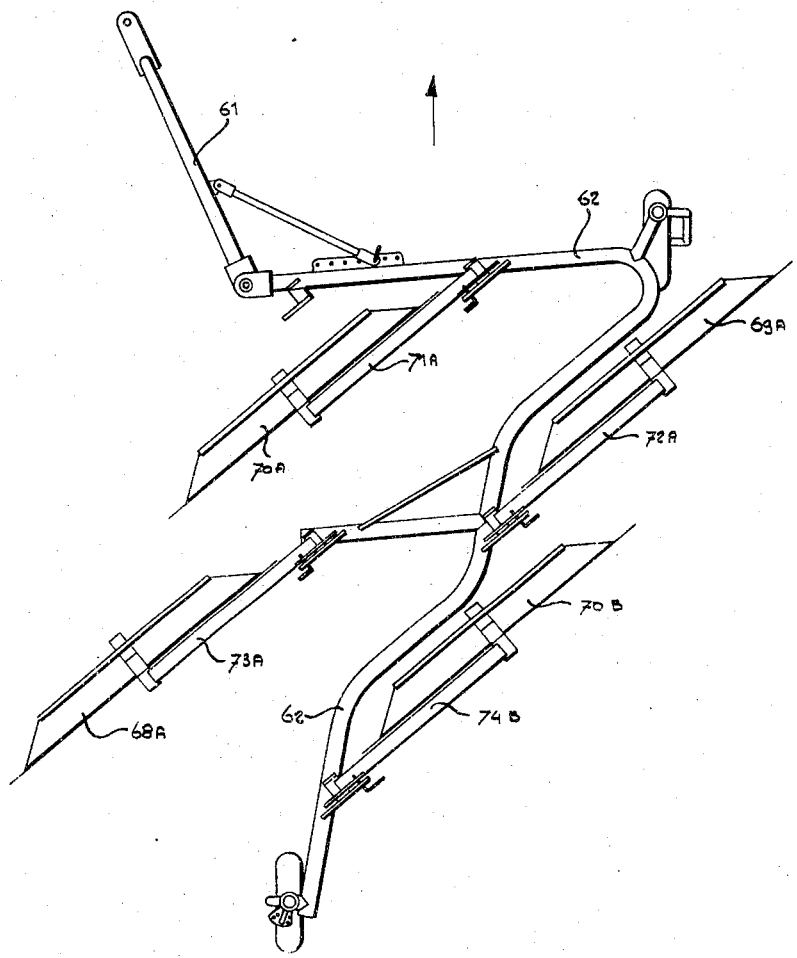

2,851,845

SIDE DELIVERY RAKE AND TEDDER

Cornelis van der Lely and Ary van der Lely, Maasland, Netherlands, assignors to C. van der Lely N. V., Maasland, Netherlands, a limited-liability company of the Netherlands Application January 24, 1956, Serial No. 561,060

Claims priority, application Netherlands February 2, 1955

13 Claims. (Cl. 56—366)

The invention relates to devices for working material lying on the ground by means of rotatable raking members, at least one of which has a hub mounted on a crank, the crank shaft of which has a direction which deviates from the vertical in the working position of the associated device.

Devices of this kind are generally known and can be used, for example, as a side delivery rake or as a swath turner. It is desirable to be able to use such a device for various purposes and one known device can be changed from a side delivery rake into a swath turner by displacing a beam on which a number of rake wheels are mounted.

It is an object of the present invention to provide an improved device which can be used for various purposes, the device being adapted to other uses very simply and easily. According to the invention, the device is provided with a crank which can be rotated about its axis of rotation to such an extent that the raking member can be placed in at least two different working positions. The position of the associated hub in one working position is substantially the mirror image of the position in the other working position with regard to a vertical plane comprising the crank shaft.

Further embodiments and details will be hereinafter more fully described with reference to the accompanying drawing in which some preferred embodiments of the invention are illustrated by way of example and in which:

Figs. 2 and 3 are plan elevations of the same device in two other working positions in which the device constitutes a teddering device and a swath turner, respectively.

Fig. 4 shows a plan elevation of a further embodiment of the invention in raking position.

Figs. 5 and 6 show plan elevations of the device according to Fig. 4 in two other working positions in which the device constitutes a teddering device and a swath turner, respectively.

Figure 1:
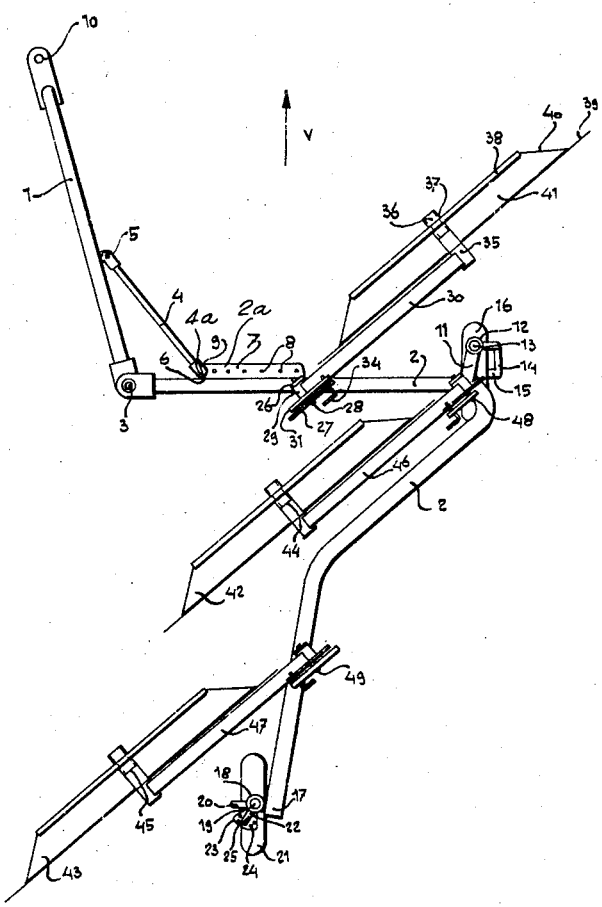
Fig. 1 is a plan elevation of a first embodiment of the invention in a working position in which the device constitutes a side delivery rake.

According to Fig. 1 an implement provided in accordance with invention comprises a frame consisting of two parts 1 and 2 which are hingedly connected to each other by means of a vertical hinge axle 3. An arm 4 is hingedly connected to the part 1 by means of a vertical hinge pin 5. At its free extremity, the arm is provided with a fork 4a in the limbs of which holes 6 are provided. The part 2 of the frame or support is provided with a strip 2a in which holes 8 are provided. By means of a pin 9, the arm 4 and thus the frame part 1 can be connected to the strip 7 in various positions. Consequently, an aperture 10 in the free extremity of the frame part 1 can be placed and secured in various positions relative to the frame part 2. The device can be coupled to a tractor by means of the aperture 10, after which the tractor can move the device in the direction of the arrow V over the ground.

The frame part 2 carries a short, fixedly arranged horizontal arm 11 to which a vertical tube 12 is attached for the purpose of constituting a journal for a vertical axle 13. The axle is fixedly connected to the horizontal axle 15 of a self-adjusting running wheel 16 by means of a bar 14.

The rearmost extremity 17 of the frame part 2 carries a vertical tube 18 which constitutes a bearing for an axle 19 which is connected to the axle of a running wheel 21 by means of a bar 20. The tube 18 carries a perforated, horizontal projection 22 and the axle 19 carries a sector 23 in which some holes 24 are defined. A locking pin 25 can be inserted through the projection 22 and the sector 23 which is located immediately below said projection 22, in order to keep the wheel 21 in a desired position. If a tractor supports the frame part 1, the support rests upon three points viz. the tractor and the running wheels 16 and 21. The frame part 2 can thus be supported in such a way that it lies substantially in a horizontal plane.

On the frame part 2 are mounted an eye 26 and a perforated disc 27 constituting journals for a hinge pin 28. A bushing 29 forming part of a crank 30 can be turned more than 180° about said pin 28 which serves as the axle. A cam 31 on the crank 30 can be secured in a number of positions by means of a locking pin 34 which is inserted through the disc 27 and said cam 31. The crank 30 carries a cross arm 35 terminating in a crank pin 36 on which a hub 37 is rotatably mounted. A ring 38 is connected to the hub 37. Teeth 39 which can displace material lying on the ground are connected to the ring 38 by means of bearing members 40. The entire raking member is indicated by 41. The axis of rotation of the raking member 41 is coplanar with the axis of rotation of the crank 30.

Further, there are provided two other raking members 42 and 43 which are mounted rotatably on crank pins 44 and 45, respectively, of cranks 46 and 47 which are mounted rotatably about axles 48 and 49 of the frame part 2. Said cranks can be secured with regard to the frame part 2 in the same manner as the crank 30.

In the working position shown in Fig. 1, the device work as a side delivery rake. The cranks 30, 46 and 47 of the raking members 41, 42 and 43 are secured in said working position so that, in their lowermost positions, the teeth of the raking members move along the ground while exerting only a light pressure. The material delivered by the raking member 41 to the left is further guided to the left by the raking member 42, while the material delivered by the raking member 42 is still further delivered laterally by the raking member 43.

For the transportation of the device, the cranks can be secured in a position in which the lowermost teeth of the raking members are spaced a certain distance from the ground.

Figure 2:
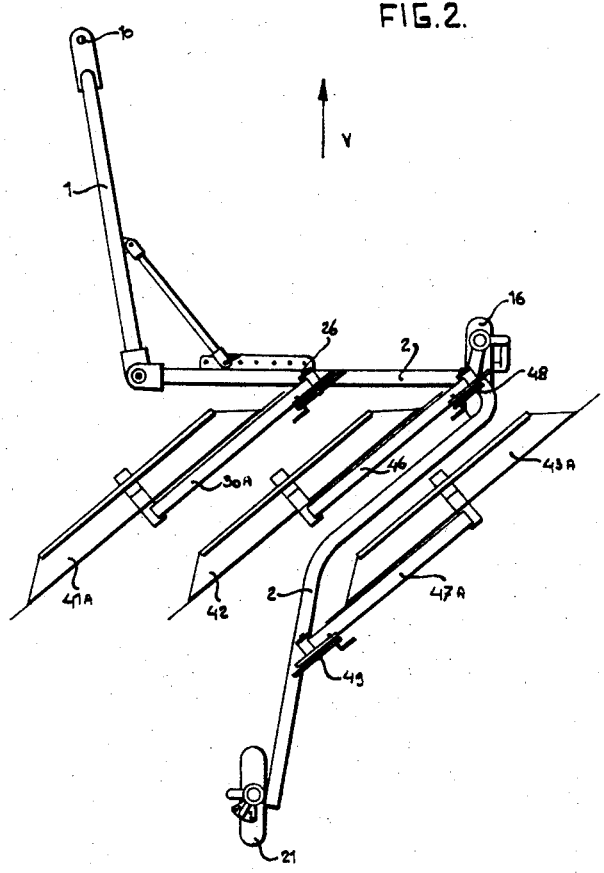

However, it is also possible to lift the cranks 30 and 47 until they have respectively reached vertical planes through the crank axles 28 and 49. Furthermore, it is possible to revise the positions of these cranks so that they take positions on the opposite sides of their respective vertical planes, this being effected by simple rotation of the cranks about their respective axes. The cranks can be secured in their different positions by means of the locking pins, such as pins 34. These positions of cranks 30 and 47 are indicated in Fig. 2 as 30A and 47A. In this position, the raking members 41 and 43 are located in new positions 41A and 43A in which positions the raking members have the same side forward as in Fig. 1 and exert the same pressure on the ground as in the working position according to Fig. 1. The device is moved in the same direction as in Fig. 1 or at a small angle with respect to said direction, this angle being adjusted by adjusting the position of the rearmost running wheel.

In the position shown in Fig. 2, the device works as a teddering device; i. e. the raking members work independently of one another and each delivers the material lying on a small strip of land slightly to the left. The small strips are adjacent and constitute one single broad strip.

The raking member 42 is mounted on the crank 46 for two reasons. In the first place, this arrangement facilitates lifting the raking member freely from the ground during transport and, in the second place, to enable the ready removal of the raking member 42 as is accomplished by releasing the pin 48. After having removed the raking member 42 along with the crank 46, the device will assume a working position as shown in Fig. 3. It will be apparent that, during the travelling movement of the device in said working position, the device can be used as a swath turner capable of turning two swaths at a time.

The same working can of course also be obtained by adjusting the arm 46 to such a height that material lying on the ground can move untouched beneath the rake wheel 42. Said position of the arm 46 will be higher than the position in which the arm is adjusted during transport.

The device according to Fig. 4 comprises a frame consisting of two hingedly connected portions 61 and 62 which are connected by means of an adjustable bar 63. Portion 62 is supported by means of running wheels 64 and 65 and portion 61 is supported, during operation, by member 66 connected to a tractor in such a way that the entire frame lies in a nearly horizontal plane. The portions 61 and 62, the bar 63 and the running wheels 64 and 65 correspond substantially to the portions 1 and 2, the bar 4 and the running wheels 16 and 21 of the device according to Fig. 1. Corresponding running wheels are mounted on the support in the same manner.

Raking members 67, 68, 69 and 70 are fixed to the portion 62, the raking members 67, 68 and 69 corresponding to the raking members 41, 42 and 43 in the device according to Fig. 1. The raking members 67 and 69 are mounted by means of cranks 71 and 72, the first of which is directed to the right and the second of which is directed to the left, so that these correspond to the cranks 30 and 47 in the position shown in Fig. 1. The raking member 68 is connected to a horizontal arm 75 of the portion 62 by means of a crank 73 which contrary to the crank 46 in Fig. 1 is directed to the right. The raking member 70 is attached to the portion 62 by means of a crank 74 directed to the left and by a hinge pin 78. The four raking members 67–70 cooperate in the position shown in Fig. 4 in such a manner that each sequential raking member will laterally displace the material delivered by the preceding raking member and the device will work as a side delivery rake upon movement in the direction of the arrow V.

In principle, the four cranks 71, 73, 72 and 74 can all be removed to opposite sides, so that the cranks pointing to the right or to the left, respectively, will point to the left or to the right.

In Fig. 5, a working position of the device according to Fig. 4 is shown which is obtained from the working position shown in Fig. 4 by turning the cranks 71 and 72 towards the positions 71A and 72A and by releasing the crank 74 with the raking member 70 and placing it at the left of the side of the other raking members. Journals 76 and 77 for the hinge pin 78A, about which the crank 74A must be able to rotate in the new position, are provided on the portion 62 near the portion 61. It will be evident that during forward motion of the device according to Fig. 5 in the direction of the arrow V said device works as a teddering device comprising four raking members for working four narrow strips of land at the same time.

Starting from the working position according to Fig. 4, it is also possible to change all four cranks 71, 73, 72 and 74 to their opposite sides, so that they will occupy the positions shown in Fig. 6. The cranks 73 and 74 and the raking members 68 and 70 then occupy positions 73A, 74B, 68A and 70B. The cranks are removed in groups of two adjacent cranks pointing to the same side and the raking members of the same group (e. g., 70A and 68A) continue cooperating after removal if the device is moved in the direction of the arrow V. The raking member 68A laterally delivers the material delivered by means of the raking member 70A. The group of raking members 70A and 68A does not cooperate, however, with the group of members 69A and 70B, but now both groups independently turn a separate swath. The device can thus be used as a swath turner.

There will now be obvious to those skilled in the art many modifications of the structures set forth without departing from the spirit of the invention as defined in the following claims.

What is claimed is:

1. An implement for treating material lying on the ground, comprising a frame, means supporting said frame for ground traversing movement, a plurality of rotatable rake wheels, and means mounting each of said rake wheels on said frame with the plane of rotation of each rake wheel being angularly displaced relative to the direction of said ground traversing movement of the frame so that, during ground traversing movement of said frame, said rake wheels are rotated by engagement with the ground and act to laterally displace material lying on the ground, said means mounting at least one of said rake wheels on the frame including a crank swingably mounted, at one end, on said frame and rotatably supporting the related rake wheel at its other end, said crank being swingable about its swinging axis relative to said frame between first and second working positions at the opposite sides, respectively, of said swinging axis, and in both said working positions said related rake wheel being engageable with the ground to be rotated by the latter and to act upon material lying on the ground, so that said related rake wheel has a different positional relationship to the other rake wheels in each of said first and second working positions of said crank.

2. An implement as in claim 1, in which the center of the rake wheel mounted on said crank in said first and second working positions of said crank has substantially the same height with regard to the frame and the same horizontal distance from said swinging axis.

3. An implement as in claim 1, in which said swinging axis of the crank is located above the frame and the center of the rake wheel mounted on said crank in one of said working positions of said crank is at one side of the frame and in the other of said working positions is at the other side of the frame.

4. An implement as in claim 1, in which said swinging axis of said crank is substantially parallel to the axis of rotation of the rake wheel mounted on said crank.

5. An implement as in claim 1; wherein said rake wheel rotatably supported by said crank is in echelon arrangement with at least one other of said rake wheels in said first working position of the crank, so that the implement then operates as a side delivery rake, and said rake wheel rotatably supported by said crank is disposed alongside said one other rake wheel in said second working position of the crank, so that the implement then operates as a teddering device.

6. An implement for treating material lying on the ground, comprising a frame, means supporting said frame for ground traversing movement, at least three rotatable rake wheels, and means mounting each of said rake wheels on said frame with the plane of rotation of each rake wheel being angularly displaced relative to the direction of said ground traversing movement of said frame so that, during ground traversing movement of said frame, peripheral contact of said rake wheels with the ground will cause rotation of the rake wheels while the latter operate to laterally displace material lying on the ground, said mounting means for at least a first and second of said rake wheels each including a crank having the related rake wheel rotatably mounted on one of its ends and being mounted, at its other end, on said frame for swinging relative to the latter, about an axis parallel to the axis of rotation of the related rake wheel, between working positions generally to the right and to the left, respectively, of its swinging axis considered with respect to said direction of ground traversing movement, each of said first and second rake wheels being engageable with the ground being traversed in both of said working positions of the related cranks, the swinging axes of said cranks being disposed on said frame so that, with said cranks of said first and second rake wheels disposed in their working positions to the right and left, respectively, of the corresponding swinging axes, said first and second rake wheels are disposed in echelon arrangement with the third of said rake wheels disposed between said first and second rake wheels, thereby to adapt the implement for operation as a side delivery rake, and, with said cranks of said first and second rake wheels disposed in their working positions to the left and right, respectively, of the corresponding swinging axes, said first and second rake wheels are arranged in a lateral row with said third rake wheel therebetween and with their peripheries substantially overlapping laterally as considered in said direction of ground traversing movement, thereby to adapt the implement for operation as a teddering device.

7. An implement as in claim 6; wherein said means mounting said third rake wheel on said frame is removable from the latter with said third rake wheel so that said first and second rake wheels then have their peripheries spaced laterally apart to adapt the implement for operation as a swath turner.

8. An implement as in claim 6; wherein said means mounting said third rake wheel on said frame also includes a crank having said third rake wheel rotatably supported at one of its ends and swingably mounted, at its other end, on said frame.

9. An implement as in claim 8; further comprising locking means releasably engageable with said crank of the third rake wheel to hold the latter in an elevated inoperative position out of engagement with the ground being traversed, thereby to adapt the implement for operation as a swath turner.

10. An implement as in claim 6; wherein said rake wheels include a fourth rake wheel, and means operatively associated with said frame for mounting said fourth rake wheel on said frame, the latter said means including alternative fastening means connected to the frame at two different locations along said frame for supporting said fourth rake wheel.

11. An implement as in claim 10; wherein each of said means for mounting said third and fourth rake wheels on said frame also includes a crank having the related rake wheel rotatably mounted on one of its ends and being swingable, at its other end, relative to said frame about an axis which is parallel to the axis of rotation of the related rake wheel, between working positions generally to the right and left, respectively, of its swinging axis considered with respect to said direction of ground traversing movement where the third and fourth rake wheels are also engageable with the ground being traversed, said crank of the third rake wheel being disposed in its working position to the right of its swinging axis when the implement is adapted for said operations as a side delivery rake and a teddering device, respectively, while said crank of the fourth rake wheel is in its working position to the left of its swinging axis carried by said fastening means at one of said locations to dispose said fourth rake wheel in said echelon arrangement with said first, second, and third rake wheels, and by said fastening means at the other of said locations to dispose said fourth rake wheel in said lateral row with said first, second and third rake wheels.

12. An implement as in claim 11; wherein said fastening means at said one location and said swinging axes of said cranks of the first, second and third rake wheels are disposed so that, with said crank of the fourth rake wheel secured to said fastening means at said one location, and with said cranks of the first and third rake which in their working positions to the left of this respective swinging axes, while said cranks of said second and fourth rake wheels are in their working positions to the right of their corresponding swinging axes, said first and third rake wheels and said second and fourth rake wheels form laterally spaced apart, echelon arranged groups of rake wheels which operate independently to adapt the implement for operation as a swath turner.

13. An implement as in claim 12; further comprising releasable locking means operatively associated with said frame and said cranks for holding each of said cranks in an inoperative position between the related working positions and where the related rake wheel is elevated out of contact with the ground being traversed.

References Cited in the file of this patent

UNITED STATES PATENTS 468,382 Beck _____ Feb. 9, 1892

FOREIGN PATENTS 517,070 Great Britain _____ Jan. 19, 1940